(12) United States Patent
Mochizuki

(10) Patent No.: US 9,213,505 B2
(45) Date of Patent: Dec. 15, 2015

(54) INFORMATION PROCESSING APPARATUS, INFORMATION PROCESSING METHOD, AND COMPUTER PROGRAM PRODUCT

(71) Applicant: Toshihiro Mochizuki, Kanagawa (JP)

(72) Inventor: Toshihiro Mochizuki, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/064,347

(22) Filed: Oct. 28, 2013

(65) Prior Publication Data

US 2014/0118773 A1   May 1, 2014

(30) Foreign Application Priority Data

Oct. 30, 2012   (JP) .................. 2012-239348

(51) Int. Cl.
G06K 15/00   (2006.01)
G06F 3/12    (2006.01)

(52) U.S. Cl.
CPC .............. *G06F 3/1241* (2013.01); *G06F 3/121* (2013.01); *G06F 3/1205* (2013.01); *G06F 3/1253* (2013.01); *G06F 3/1284* (2013.01); *G06K 15/408* (2013.01)

(58) Field of Classification Search
USPC ....................................................... 358/1.18
See application file for complete search history.

(56) References Cited

U.S. PATENT DOCUMENTS

2005/0206953 A1* 9/2005 Kujirai et al. ................ 358/1.15
2006/0238810 A1* 10/2006 Fukudome .......... G06F 17/2745
                                                                358/1.16
2008/0239398 A1* 10/2008 Nakagiri et al. ............. 358/1.18

FOREIGN PATENT DOCUMENTS

| JP | 10-136143   | 5/1998  |
| JP | 2005-297294 | 10/2005 |
| JP | 2011-062938 | 3/2011  |

* cited by examiner

*Primary Examiner* — Huo Long Chen
(74) *Attorney, Agent, or Firm* — Oblon, McClelland, Maier & Neustadt, L.L.P.

(57) ABSTRACT

An information processing apparatus includes: a generating unit that generates a print job including one or more print data, first information indicating the one or more print data divided into multiple units for which respective print conditions when printing is executed are set, and second information indicating the print conditions; an accepting unit that accepts designation input which designates a print range of a specified job indicating a print job specified from among one or more print jobs; a determining unit that determines whether a unit is included in the print range with respect to each of units indicated by first information included in the specified job; and an output control unit that performs control, as for a unit determined to be partially included in the print range by the determining unit, so as to output options to set a print condition for the unit.

7 Claims, 5 Drawing Sheets

INFORMATION PROCESSING APPARATUS, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2012-239348 filed in Japan on Oct. 30, 2012.

BACKGROUND OF THE INVENTION

1. Field of the Invention

The present invention relates to an information processing apparatus, an information processing method, and a computer program product.

2. Description of the Related Art

Conventionally, there is known a technology, called "by chapter" or "section", that divides one print job into subsets and allows the print settings (such as the post-processing setting) to vary between the chapters of the print job. Furthermore, there is known a technology that in the case where a print job in which post-processing such as stapling is designated is interrupted due to a jam or the like, upon resumption of printing, prints out data of a document from the first page again and staples its print-out (see, for example, Japanese Patent Application Laid-open No. 2011-062938).

However, such conventional technologies have a problem that in the case reprinting while modifying a print range of a print job in which the print settings have been made with respect to each chapter, because regarding a chapter only a part of which is included in the reprinting range, only the part included in the reprinting range is printed, and the print settings corresponding to the chapter are applied to only the part included in the reprinting range, for example, even when a user desires to set the whole of the chapter as an object to be printed and set the print settings corresponding to the chapter or desires not to set the print settings corresponding to the chapter, the user cannot obtain the desired print result. Namely, the conventional technologies result in reduced user-friendliness.

In view of the above, there is a need to provide an information processing apparatus, an information processing method, and a computer program product capable of improving the user-friendliness.

SUMMARY OF THE INVENTION

It is an object of the present invention to at least partially solve the problems in the conventional technology.

An information processing apparatus includes: a generating unit that generates a print job including one or more print data, first information indicating the one or more print data divided into multiple units for which respective print conditions indicating conditions when printing is executed are set, and second information indicating the respective print conditions set for the units; a holding unit that holds therein the print job; an accepting unit that accepts designation input which designates a print range of a specified job indicating a print job specified from among one or more print jobs held in the holding unit; a determining unit that determines, when the accepting unit accepts the designation input, whether a unit is included in the print range indicated by the designation input with respect to each of units indicated by first information included in the specified job; and an output control unit that performs control, as for a unit determined to be partially included in the print range by the determining unit, so as to output options to set a print condition for the unit.

An information processing method includes: generating a print job including one or more print data, first information indicating the one or more print data divided into multiple units for which respective print conditions are set, and second information indicating the respective print conditions set for the units; accepting designation input which designates a print range of a specified job indicating a print job specified from among one or more print jobs held in a holding unit which holds therein the print job generated at the generating; determining, upon acceptance of the designation input, whether a unit is included in the print range indicated by the designation input with respect to each of units indicated by first information included in the specified job; and performing control, as for a unit determined to be partially included in the print range at the determining, so as to output options to set a print condition for the unit.

A computer program product includes a non-transitory computer-usable medium having computer-readable program codes embodied in the medium. The program codes when executed causes a computer to execute: generating a print job including one or more print data, first information indicating the one or more print data divided into multiple units for which respective print conditions are set, and second information indicating the respective print conditions set for the units; accepting designation input which designates a print range of a specified job indicating a print job specified from among one or more print jobs held in a holding unit which holds therein the print job generated at the generating; determining, upon acceptance of the designation input, whether a unit is included in the print range indicated by the designation input with respect to each of units indicated by first information included in the specified job; and performing control, as for a unit determined to be partially included in the print range at the determining, so as to output options to set a print condition for the unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an information processing apparatus, information processing method, and program according to the present invention will be explained in detail below with reference to accompanying drawings.

Figure 1:
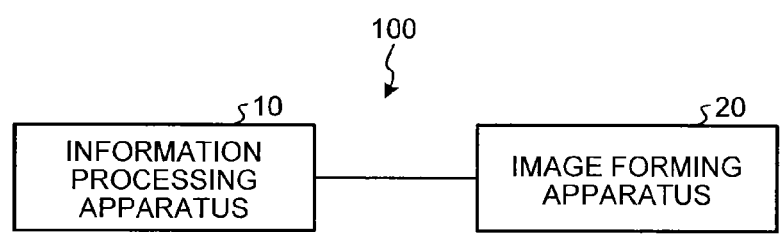
FIG. 1 is a block diagram showing a schematic configuration example of an image forming system according to an embodiment.

FIG. 1 is a block diagram showing a schematic configuration example of an image forming system 100 according to the present embodiment. As shown in FIG. 1, the image forming system 100 includes an information processing apparatus 10 and an image forming apparatus 20. Here, the information processing apparatus 10 is composed of a personal computer (PC) used by a user. In this example, the PC used by the user corresponds to an "information processing apparatus" in claims. Detailed functions of the information processing apparatus 10 will be described later. The image forming apparatus 20 executes printing in accordance with a print job transmitted from the information processing apparatus 10. The image forming apparatus 20 can be any type of image forming apparatus having a function of forming an image on a recording medium such as a sheet of paper; for example, the image forming apparatus 20 can be composed of a multifunction peripheral (MFP) having at least two functions out of print, copy, scanner, and facsimile functions.

Figure 2:
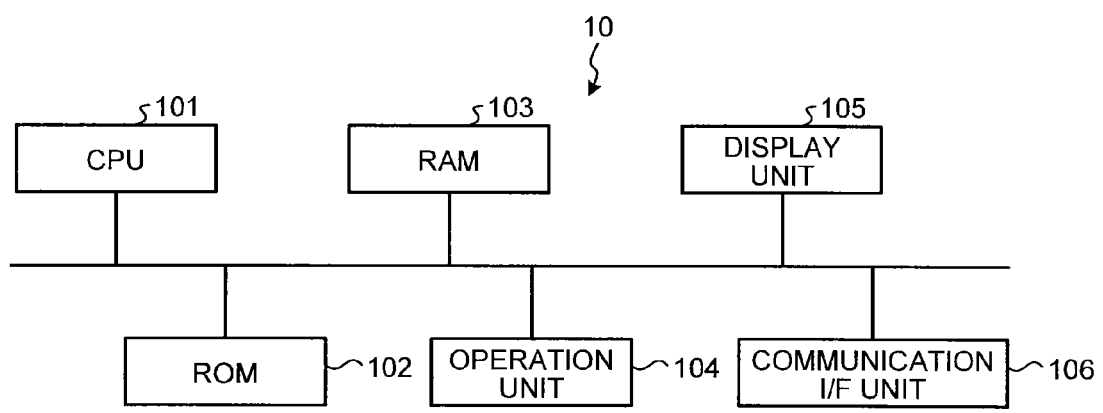
FIG. 2 is a diagram showing a hardware configuration example of an information processing apparatus according to the embodiment.

FIG. 2 is a diagram showing a hardware configuration example of the information processing apparatus 10. As shown in FIG. 2, the information processing apparatus 10 includes a CPU 101, a ROM 102, a RAM 103, an operation unit 104, a display unit 105, and a communication I/F unit 106.

The CPU 101 is a device that controls the operation of the entire information processing apparatus 10. The ROM 102 is a non-volatile memory, and stores therein a program and various data. The RAM 104 is a volatile memory, and serves as a work area (a work memory) of the CPU 101. The operation unit 104 is a device that receives various user inputs, and can be composed of, for example, a keyboard and/or the like. The display unit 105 is a device for displaying thereon a variety of information, and can be composed of, for example, a liquid crystal display device or the like. The communication I/F unit 106 is an interface for communicating with the image forming apparatus 20.

Figure 3:
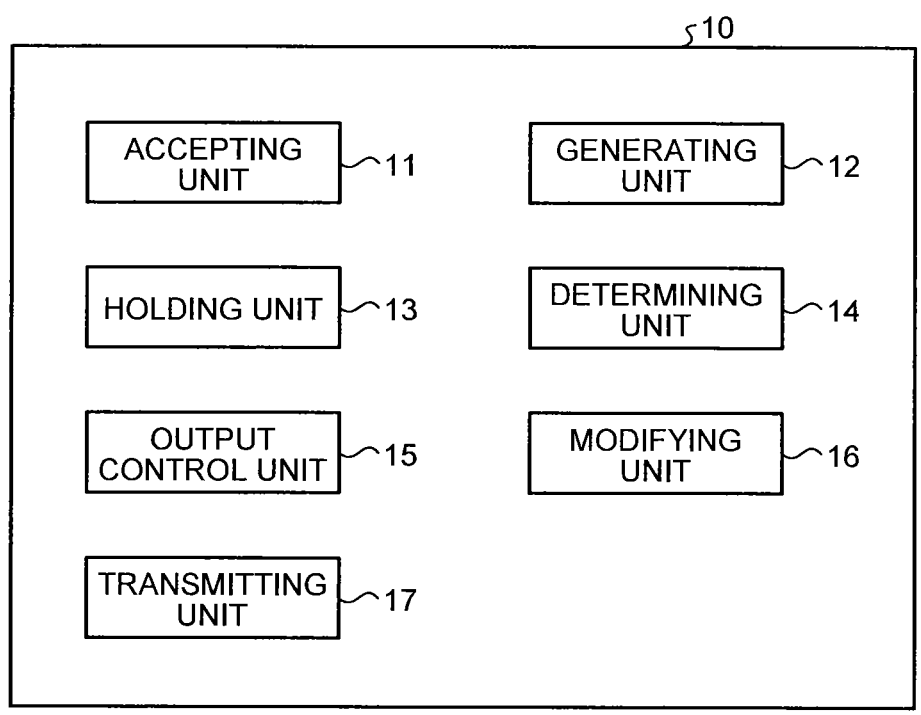
FIG. 3 is a diagram showing a functional configuration example of the information processing apparatus according to the embodiment.

FIG. 3 is a block diagram showing a functional configuration example of the information processing apparatus 10. As shown in FIG. 3, the information processing apparatus 10 includes an accepting unit 11, a generating unit 12, a holding unit 13, a determining unit 14, an output control unit 15, a modifying unit 16, and a transmitting unit 17.

Figure 4:
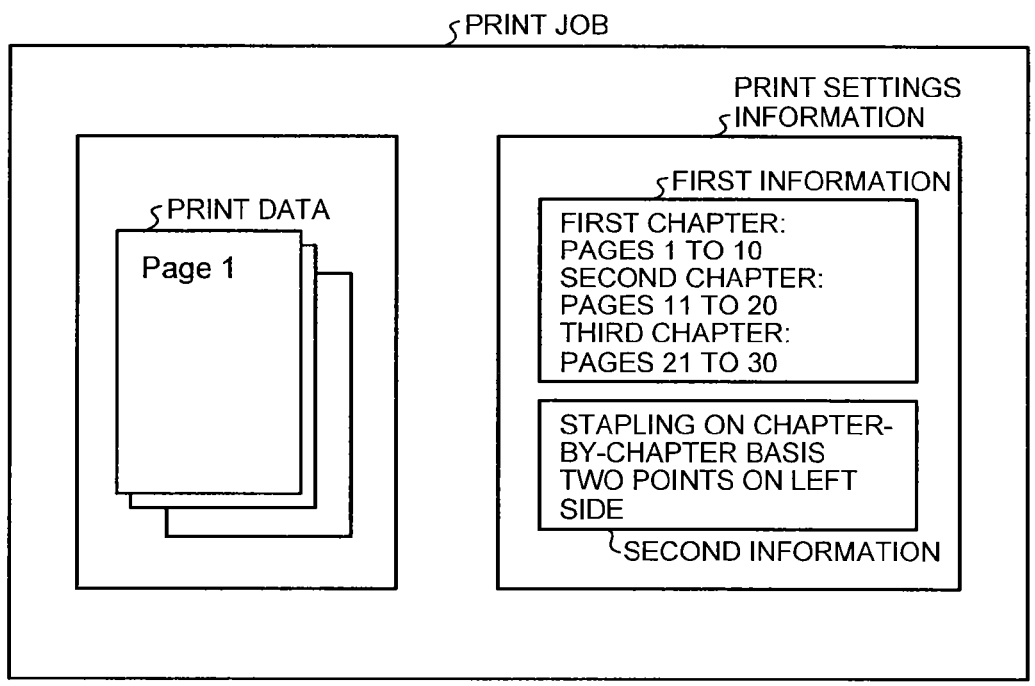
FIG. 4 is a diagram schematically showing a configuration example of a print job.

The accepting unit 11 has a function of accepting various inputs. The generating unit 12 has a function of generating a print job in response to a user operation input. FIG. 4 is a diagram showing an example of a print job generated by the generating unit 12. As shown in FIG. 4, the print job includes one or more print data representing image data to be printed and print settings information.

As the format of the print data, for example, PDF (Portable Document Format) can be used; however, the print data format is not limited to this, and any other formats can be used as the data format of print data. In the example shown in FIG. 4, a constituent unit of printed material is referred to as "page" (one side of one sheet of paper corresponds to one page), and each piece of print data is image data of one page. The print job exemplified in FIG. 4 includes print data of 30 pages.

The print settings information is a job command that designates a print condition indicating a condition when printing of print data is executed. As the format of the job command, for example, JDF (Job Definition Format) can be used; however, the job command format is not limited to this. As shown in FIG. 4, the print settings information includes first information and second information. The first information is information indicating division of one or more print data into multiple units (referred to as "chapters" in this example, but can be arbitrarily referred to as "sections" or "subsets") for which respective print conditions are set. In the example shown in FIG. 4, the first information indicates that the print data of 30 pages are divided into three chapters (the first chapter, the second chapter, and the third chapter); the first chapter is composed of print data of pages 1 to 10, the second chapter is composed of print data of pages 11 to 20, and the third chapter is composed of print data of pages 21 to 30.

Figure 5:
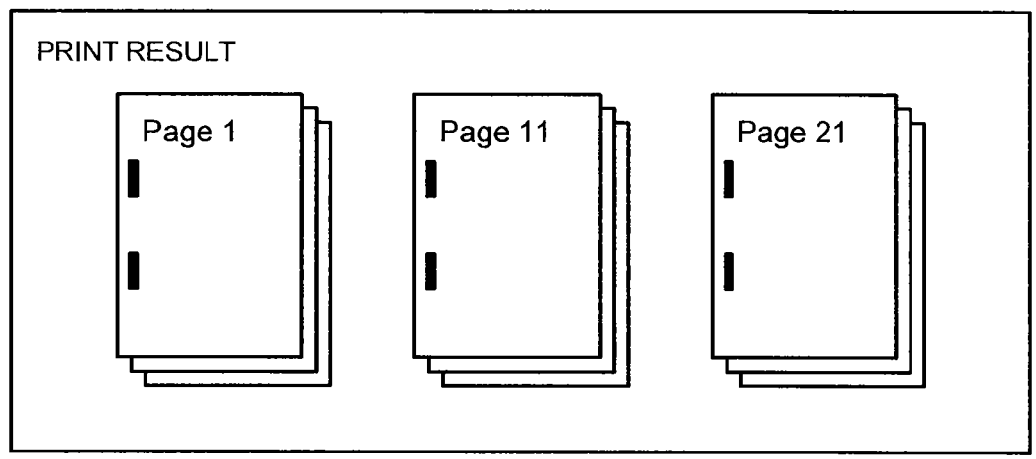
FIG. 5 is a diagram showing an example of a print result.

The second information is information indicating the respective print conditions set for the chapters. The second information exemplified in FIG. 4 is information indicating a post-processing condition that indicates execution of two-point left-side stapling on a chapter-by-chapter basis. In this example, the post-processing condition indicating that stapling on a chapter-by-chapter basis should be executed is set as a print condition; therefore, in the case where all the print data included in the print job exemplified in FIG. 4 are printed (i.e., in the case where all pages of the image data are printed), a print result is as shown in FIG. 5.

Incidentally, the respective print conditions set for the chapters are optional. For example, a post-processing condition indicating that folding or punching should be executed on a chapter-by-chapter basis can be set as a print condition, or a print condition indicating that duplex printing should be executed on a chapter-by-chapter basis can be set. Furthermore, the print condition set for each chapter can be the same as other chapters, or can differ from chapter to chapter. The generating unit 12 has the function of generating a print job as described above in response to a user operation input.

To return to FIG. 3 and continue the explanation, the holding unit 13 has a function of holding therein a print job generated by the generating unit 12. In the present embodiment, a user can specify any of one or more print jobs held in the holding unit 13 by operating the operation unit 104. Furthermore, the user can perform input to designate a print range of the specified job by operating the operation unit 104.

The determining unit 14 has a function of determining, when the accepting unit 11 has accepted designation input which designates a print range of a specified job indicating a print job specified from among one or more print jobs held in the holding unit 13, whether a range of a chapter is included in the print range indicated by the designation input, for each of chapters indicated by first information included in the specified job.

Figure 6:
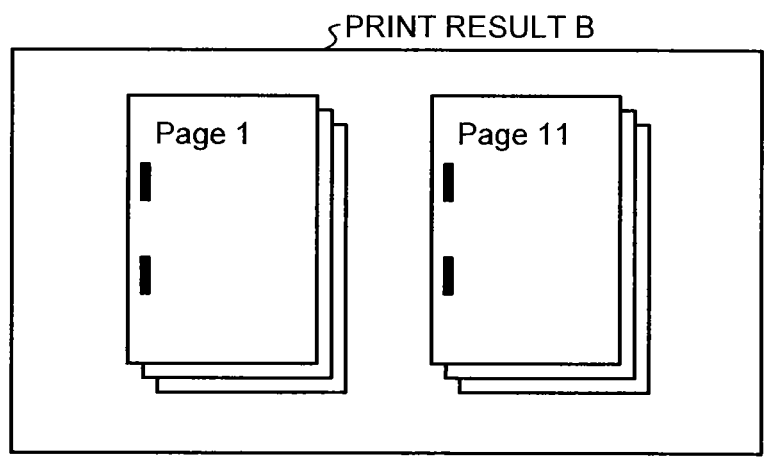
FIG. 6 is a diagram showing an example of a print result.
Figure 7:
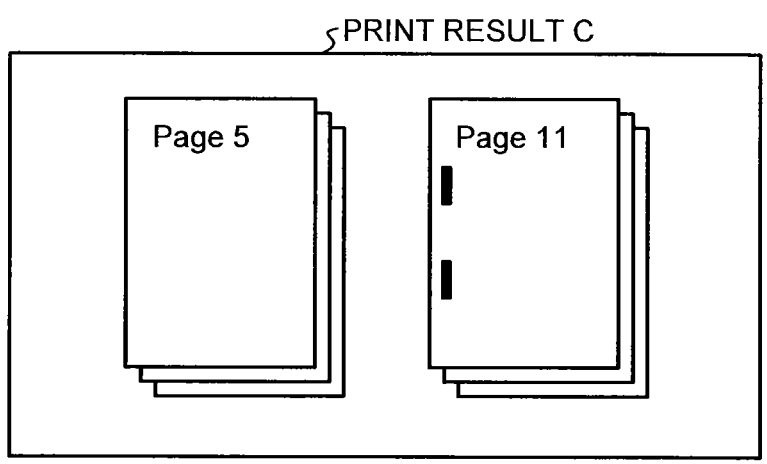
FIG. 7 is a diagram showing an example of a print result.

As for a chapter determined to be partially included in the print range by the determining unit 14, the output control unit 15 performs control so as to output options for setting a print condition for the chapter. Here is an assumption that a user specifies the print job exemplified in FIG. 4 from among one or more print jobs held in the holding unit 13 and performs designation input to designate pages 5 to 20 as a print range of the specified print job. The print job exemplified in FIG. 4 is originally a job in which the post-processing condition indicating that stapling should be executed on a chapter-by-chapter basis is set; therefore, a result that the user desires to obtain is expected to be like a print result B exemplified in FIG. 6 that print data of the whole chapter is reprinted and its print-out is stapled, or like a print result C exemplified in FIG. 7 that print data of a chapter is output without being stapled if the whole of the chapter is not included in the print range.

Accordingly, in the present embodiment, as for the chapter determined to be partially included in the print range (pages 5 to 20) indicated by the designation input (the first chapter, in this example), the output control unit 15 performs control so as to display (an example of output) an image prompting a user to select either the print result B or the print result C (an image showing an option corresponding to the print result B and an option corresponding to the print result C) on the display unit 105. Namely, at least one of options displayed on the display unit 105 includes to expand the print range so as to include the whole range of the chapter determined to be partially included in the print range indicated by the designation input and set a print condition indicated by second information included in the specified job, for the chapter (the option corresponding to the print result B). Furthermore, at least one of the options includes not to set the print condition indicated by the second information included in the specified job, for a part included in the print range, out of the chapter determined to be partially included in the print range indicated by the designation input (the option corresponding to the print result C). The user can select any of the options displayed on the display unit 105 by operating the operation unit 104 or directly touching the screen of the display unit 105.

The modifying unit 16 shown in FIG. 3 has a function of modifying the specified job in accordance with a selected option. The transmitting unit 17 shown in FIG. 3 has a function of transmitting the print job generated by the generating unit 12 or the specified job modified by the modifying unit 16 to the image forming apparatus 20. For example, when the option corresponding to the print result B is selected, the modifying unit 16 expands the print range to pages 1 to 20, and then transmits the print job in which stapling of respective print-outs of the first and second chapters is set, to the image forming apparatus 20. On the other hand, when the option corresponding to the print result C is selected, the modifying unit 16 sets the print range to pages 5 to 20 indicated by the designation input, and recreates a print job in which stapling of only the print-out of the second chapter without stapling of the print-out of the first chapter is set, and then transmits the recreated print job to the image forming apparatus 20. Consequently, the user can obtain the desired print result.

Incidentally, in the present embodiment, the output control unit 15 performs control so as to display the image showing the options on the display unit 105; however, the form of output is not limited to this, and, for example, the output control unit 15 can be configured to output the options by voice via a speaker. Namely, any form may be employed as long as, as for a chapter determined to be partially included in a print range by the determining unit 14, the output control unit 15 performs control so as to output options for setting a print condition for the chapter.

In the present embodiment, the CPU 101 deploys the program stored in the ROM 102 or the like in the RAM 103, and executes the program, thereby realizing the functions of units of the information processing apparatus 10 (the accepting unit 11, the generating unit 12, the determining unit 14, the output control unit 15, the modifying unit 16, and the transmitting unit 17); however, the way to realize the functions of the units is not limited to this, and, for example, at least some of the functions of the units (the accepting unit 11, the generating unit 12, the determining unit 14, the output control unit 15, the modifying unit 16, and the transmitting unit 17) can be realized by a dedicated hardware circuit. Furthermore, the holding unit 13 can be realized by, for example, the ROM 102 or the like.

Figure 8:
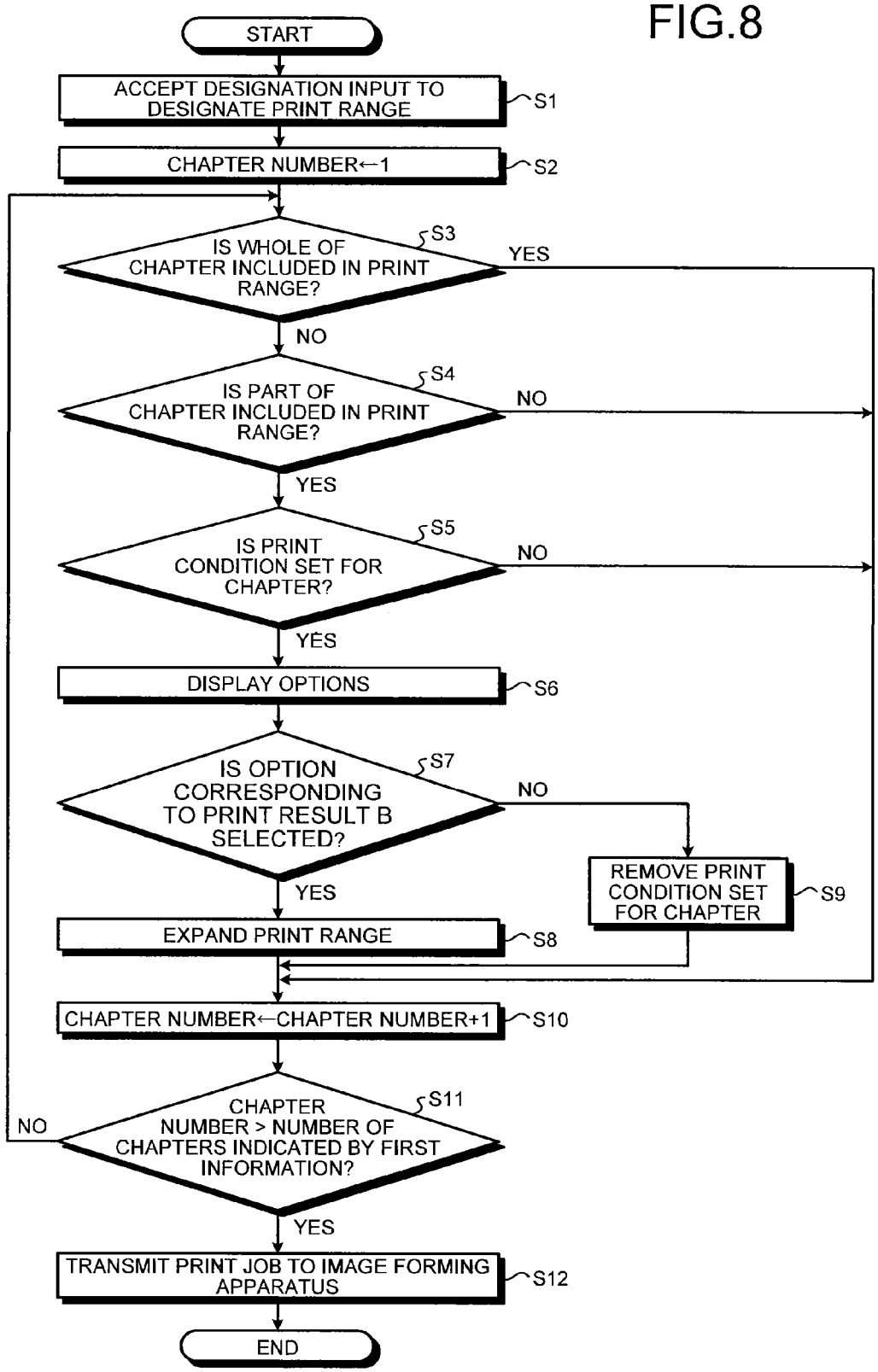
FIG. 8 is a flowchart showing an operation example of the information processing apparatus according to the embodiment.

Subsequently, an operation example of the information processing apparatus 10 is explained with reference to FIG. 8. Here is an assumption that a user specifies any one of one or more print jobs held in the holding unit 13, and modifies a print range of the specified print job, and then causes the image forming apparatus 20 to execute printing. FIG. 8 is a flowchart showing the operation example of the information processing apparatus 10 under the assumption. First, the user performs designation input to designate a print range of the specified job, and the accepting unit 11 accepts the designation input (Step S1).

Next, the determining unit 14 sets a count value of chapter number to "1" (Step S2). Then, the determining unit 14 determines whether the whole of a chapter corresponding to the number indicated by the count value (for example, the first chapter if the count value is "1") is included in the print range indicated by the designation input with reference to first information included in the specified job (Step S3). When the determining unit 14 determines that the whole of the chapter is included in the print range (YES at Step S3), the process moves on to Step S10 to be described later.

On the other hand, when determining that the whole of the chapter is not included in the print range (NO at Step S3), the determining unit 14 determines whether a part of the chapter is included in the print range (Step S4). When the determining unit 14 determines that any part of the chapter is not included in the print range (NO at Step S4), the process moves on to Step S10 to be described later. On the other hand, when determining that a part of the chapter is included in the print range (YES at Step S4), the determining unit 14 determines whether a print condition is set for the chapter with reference to second information included in the specified job (Step S5).

At the above-described Step S5, when the determining unit 14 determines that no print condition is set for the chapter determined to be partially included in the print range (NO at Step S5), the process moves on to Step S10 to be described later. On the other hand, at the above-described Step S5, when the determining unit 14 determines that a print condition is set for the chapter determined to be partially included in the print range (NO at Step S5), the output control unit 15 performs control so as to output options for setting a print condition for the chapter (Step S6). In this example, the output control unit 15 performs control so as to display an image showing an option corresponding to the print result B and an option corresponding to the print result C on the display unit 105.

When the user selects the option corresponding to the print result B, i.e., when the accepting unit 11 accepts an input of selection of the option corresponding to the print result B (YES at Step S7), the modifying unit 16 expands the print range so as to include the whole range of the chapter determined to be partially included in the print range at Step S4 (Step S8), and keeps the print condition set for the chapter unchanged. Namely, the original print condition indicated by the second information included in the specified job is set for the chapter. On the other hand, when the user selects the option corresponding to the print result C (NO at Step S7), the modifying unit 16 removes (turns off) the print condition set for the chapter determined to be partially included in the print range at Step S4 (Step S9).

Next, the determining unit 14 counts up the count value of chapter number by "1" (Step S10). Then, the determining unit 14 determines whether the count value of chapter number exceeds the number of chapters indicated by the first information included in the specified job (Step S11). When the determining unit 14 determines that the count value of chapter number does not exceed the number of chapters indicated by the first information included in the specified job (NO at Step S11), the process returns to the above-described Step S3, and the processes from Step S3 onward are repeated. On the other hand, when the determining unit 14 determines that the count value of chapter number exceeds the number of chapters indicated by the first information included in the specified job (YES at Step S11), the transmitting unit 17 transmits the specified job modified by the modifying unit 16 to the image forming apparatus 20 (Step S12).

As explained above, in the present embodiment, when the accepting unit 11 accepts designation input which designates a print range of a specified job indicating a print job specified from among one or more print jobs held in the holding unit 13, whether a chapter is included in the print range indicated by the designation input is determined with respect to each of chapters indicated by first information included in the specified job, and, as for a chapter determined to be partially included in the print range, control to output options for setting a print condition for the chapter is performed. Then, printing is performed in accordance with the specified job modified according to an option selected by a user; therefore, it is possible to achieve an advantageous effect that the user can obtain a desired print result.

Although the embodiment of the present invention is described above, the embodiment is provided as an example and not intended to limit the scope of the present invention. The present invention is not limited to the above embodiment as it, and may be embodied while modifying components without deviating from the gist of the invention in a practice stage. For example, some components from among all components illustrated in the embodiments may be deleted.

For example, a controller (a digital front end (DFE)) for controlling the image formation in the image forming apparatus 20 can be provided separately from the image forming apparatus 20; in this case, the DFE corresponds to an "information processing apparatus" in claims. In this configuration, the DFE has the functions of the accepting unit 11, the generating unit 12, the holding unit 13, the determining unit 14, the output control unit 15, the modifying unit 16, and the transmitting unit 17.

Furthermore, the DFE and the image forming apparatus 20 can be integrated into one apparatus. Namely, the present invention can be applied to an image forming apparatus as well, and the image forming apparatus according to the present invention only has to include at least a generating unit, a holding unit, an accepting unit, a determining unit, and an output control unit. The generating unit generates a print job including one or more print data, first information indicating the one or more print data divided into multiple units for which respective print conditions are set, and second information indicating the respective print conditions set for the units. The holding unit holds therein the print job generated by the generating unit. The accepting unit accepts designation input which designates a print range of a specified job indicating a print job specified from among one or more print jobs held in the holding unit. When the accepting unit accepts the designation input, the determining unit determines whether a unit is included in the print range indicated by the designation input with respect to each of units indicated by first information included in the specified job. As for a unit determined to be partially included in the print range by the determining unit, the output control unit performs control so as to output options for setting a print condition for the unit.

Incidentally, the program executed by the information processing apparatus 10 can be provided in such a way that the program is recorded on a computer-readable recording medium, such as a CD-ROM, a flexible disk (FD), a CD-R, or a digital versatile disk (DVD), in an installable or executable file format.

Furthermore, the program executed by the information processing apparatus 10 can be provided in such a way that the program is stored on a computer connected to a network such as the Internet and is downloaded via the network. Moreover, the program executed by the information processing apparatus 10 can be provided or distributed via a network such as the Internet.

According to the embodiment, it is possible to improve the user-friendliness.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a generating unit that generates a print job including one or more print data, first information indicating the one or more print data divided into multiple units for which respective print conditions indicating conditions when printing is executed are set, and second information indicating the respective print conditions set for the units;
a holding unit that holds therein the print job;
an accepting unit that accepts designation input which designates a print range of a specified job indicating a print job specified from among one or more print jobs held in the holding unit;
a determining unit that determines, when the accepting unit accepts the designation input, whether a unit is included in the print range indicated by the designation input with respect to each of units indicated by first information included in the specified job; and
an output control unit that performs control, for a unit determined to be partially included in the print range by the determining unit, to display information for selecting one of a setting to expand the print range so as to include the whole range of the unit and set a print condition indicated by second information included in the specified job for the unit, and a setting not to set a print condition, the print condition being different from the print range, indicated by the second information included in the specified job, for a part included in the print range out of the unit,
wherein the unit is a chapter.

2. The information processing apparatus according to claim 1, wherein
the print condition includes a post-processing condition indicating that post-processing including stapling should be executed.

3. The information processing apparatus according to claim 1, further comprising:
a modifying unit that modifies the specified job according to a selected option; and
a transmitting unit that transmits the print job generated by the generating unit or the specified job modified by the modifying unit to an image forming apparatus which forms an image on a recording medium.

4. An information processing method comprising:
generating a print job including one or more print data, first information indicating the one or more print data divided into multiple units for which respective print conditions are set, and second information indicating the respective print conditions set for the units;
accepting designation input which designates a print range of a specified job indicating a print job specified from among one or more print jobs held in a holding unit which holds therein the print job generated at the generating;

determining, upon acceptance of the designation input, whether a unit is included in the print range indicated by the designation input with respect to each of units indicated by first information included in the specified job;

performing control, for a unit determined to be partially included in the print range at the determining, to display information for selecting one of a setting to expand the print range so as to include the whole range of the unit and set a print condition indicated by second information included in the specified job for the unit, and a setting not to set a print condition, the print condition being different from the print range, indicated by the second information included in the specified job, for a part included in the print range out of the unit; and printing, using a printer, the print range of the specified job, wherein the unit is a chapter.

5. The information processing method according to claim 4, wherein:

the print condition includes a post-processing condition indicating that post-processing including stapling should be executed.

6. A computer program product comprising a non-transitory computer-usable medium having computer-readable program codes embodied in the medium, wherein the program codes when executed causes a computer to execute:

generating a print job including one or more print data, first information indicating the one or more print data divided into multiple units for which respective print conditions are set, and second information indicating the respective print conditions set for the units;

accepting designation input which designates a print range of a specified job indicating a print job specified from among one or more print jobs held in a holding unit which holds therein the print job generated at the generating;

determining, upon acceptance of the designation input, whether a unit is included in the print range indicated by the designation input with respect to each of units indicated by first information included in the specified job; and performing control, for a unit determined to be partially included in the print range at the determining, to display information for selecting one of a setting to expand the print range so as to include the whole range of the unit and set a print condition indicated by second information included in the specified job for the unit, and a setting not to set a print condition, the print condition being different from the print range, indicated by the second information included in the specified job, for a part included in the print range out of the unit, wherein the unit is a chapter.

7. The computer program product according to claim 6, wherein:

the print condition includes a post-processing condition indicating that post-processing including stapling should be executed.

* * * * *